(12) United States Patent
Friedman et al.

(10) Patent No.: US 7,429,761 B2
(45) Date of Patent: Sep. 30, 2008

(54) HIGH POWER DIODE UTILIZING SECONDARY EMISSION

(75) Inventors: Moshe Friedman, Washington, DC (US); Matthew Myers, Beltsville, MD (US); Frank Hegeler, Vienna, VA (US); John Sethian, Burke, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 189 days.

(21) Appl. No.: 11/014,458

(22) Filed: Dec. 17, 2004

(65) Prior Publication Data

US 2005/0199982 A1 Sep. 15, 2005

Related U.S. Application Data

(60) Provisional application No. 60/530,609, filed on Dec. 19, 2003.

(51) Int. Cl.
*H01L 29/74* (2006.01)

(52) U.S. Cl. ............ 257/152; 257/199; 257/481; 438/91

(58) Field of Classification Search .......... 438/20
See application file for complete search history.

(56) References Cited

U.S. PATENT DOCUMENTS

| | | | | |
|---|---|---|---|---|
| 4,279,974 | A * | 7/1981 | Nishio | 429/104 |
| 5,311,010 | A * | 5/1994 | Kruger | 250/214 VT |
| 6,890,495 | B1* | 5/2005 | Inman | 422/186.04 |
| 2003/0076023 | A1* | 4/2003 | Komoda et al. | 313/310 |
| 2006/0091780 | A1* | 5/2006 | Minami | 313/495 |

FOREIGN PATENT DOCUMENTS

JP  2001017980 A  *  1/2001

OTHER PUBLICATIONS

Myers et al., "Development of a durable, large area cathode for repetitive, uniform electron beam generation", Presented at the 13th IEEE Pulsed Power Conference, Las Vegas, NV, Jun. 17-22, 2001. IEEE, New York, NY p. 710 (2002).*

B. Goplen, L. Ludeking, D. Smithe, and G. Warren, "User-configurable MAGIC for electromagnetic PIC calculations", *Comp. Phys. Comm.* 87, pp. 54-86 (1995).

Sethian, J.D., Myers, M., Smith, I.D., Carboni, V., Kishi, J., Morton, D., Pearce, J., Bowen, B., Schlitt, L., Barr, O., and Webster, W.,"Pulsed Power for a Rep-Rate, Electron beam Pumped KrF Laser",*IEEE Trans. Plasma Sci.*, vol. 28, No. 5, pp. 1333-1337 (2000).

F. Hegeler, M. Friedman, M.C. Myers, J.D. Sethian, and S.B. Swanekamp,"Reduction of edge emission in electron beam diodes", *Phys. Plasmas*, V. 9, No. 10, pp. 4309-4315 (2002).

V. Baglin, Y. Bozhko, O. Grobner, B. Henrist,, N. Hilleret, C. Scheueriein and M. Taborelli,"The Secondary Yield of Technical Material and its Variation with Surface Treatments", CERN CLIC Structure Working Group (document length-33 pages) (2000).

Karl Sohlberg, Stephen J. Pennycook and Sokrates T. Pantelides,"Hydrogen and the Structure of the Transition Aluminas", *J. Am. Chem. Soc.*, vol. 121, pp. 7493-7499 (1999).

T. M. Antonsen, Jr., W.H. Miner, E. Ott, and A. T. Drobot,"Stability of space-charge limited electron flow", *The Physics of Fluids*, V. 27, pp. 1257-1267 (1984).

* cited by examiner

*Primary Examiner*—Alonzo Chambliss
(74) *Attorney, Agent, or Firm*—John J. Karasek; L. George Legg

(57) ABSTRACT

A high power diode includes a cathode for emitting a primary electron discharge, an anode, and a porous dielectric layer, e.g. a honeycomb ceramic, positioned between the cathode and the anode for receiving the primary electron discharge and emitting a secondary electron discharge. The diode can operate at voltages 50 kV and higher while generating an electron beam with a uniform current density in the range from 1 A/cm$^2$ to >10 kA/cm$^2$ throughout the area of the cathode. It is capable of repetitively pulsed operation at a few Hz with pulse duration from a few nanoseconds to more than a microseconds, while the total number of pulses can be >10$^7$ pulses. The diode generates minimal out-gassing or debris, i.e. with minimal ablation, providing a greater diode lifetime, and can operate in a high vacuum environment of 10$^{-4}$ Torr. The high power diode is useful in many applications requiring a high current electron beam. Exemplary applications include x-ray photography of large samples, polymerization processes, sterilization of biological and chemical agents, irradiation of food, and as a pump for lasers, e.g. excimer lasers such as krypton fluorine (KrF) lasers.

29 Claims, 15 Drawing Sheets

Velvet    Carbon fiber    Carbon cloth

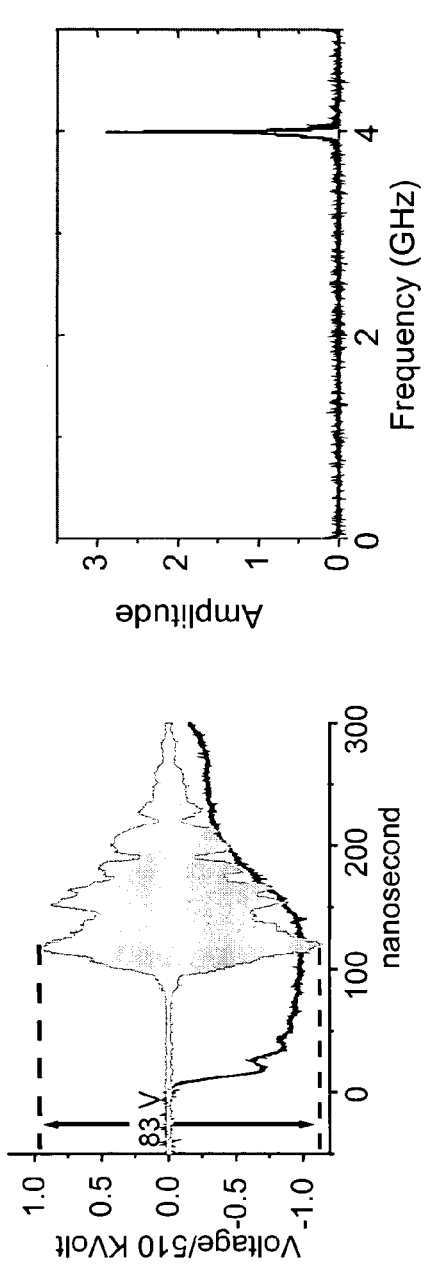
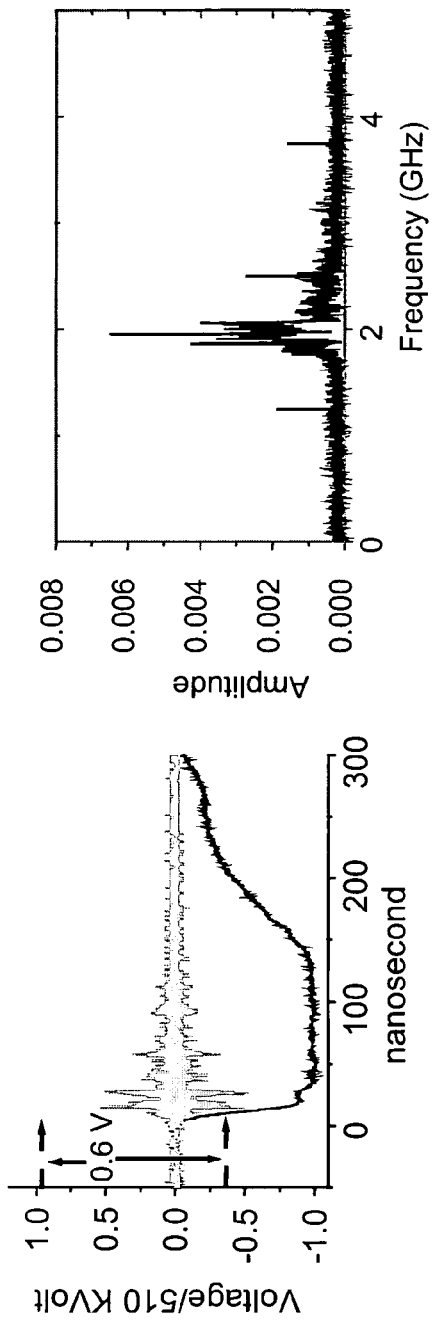
FIG. 15(a)
FIG. 15(b)

HIGH POWER DIODE UTILIZING SECONDARY EMISSION

The present application claims the benefit of the priority filing date of provisional patent application No. 60/530,609, filed Dec. 19, 2003, incorporated herein by reference.

FIELD OF THE INVENTION

This invention relates to a high power diode used for generating an intense electron beam. More particularly, the invention relates to a diode capable of operating at voltages equal to or exceeding 50 kV.

BACKGROUND OF THE INVENTION

High power diodes for generating high current electron beams are useful for many applications. One example is in pumping excimer gas lasers, such as krypton fluorine (KrF) lasers. The electron beams are generated from a field emission cold cathode and extracted into the lasing gas through thin metallic foils. The cathodes are driven by pulsed power generators, of 300 kV-700 kV voltage, and of current $\geq 100$ kA, with pulse duration of up to 1 μsec. Application of electron beam pumped gas lasers include directed energy weapons, materials processing, pathogen detection, large area x-rays sources for probing sealed packages, explosives detection, and as a driver for inertial fusion energy.

To be useful for these various applications the high current electron beam should have the following capabilities:
1. Pulse durations from 10 nsec to up to 1 μsec.
2. Repetitive operation from a shot every few minutes to 100 shots per second.
3. Long life ($10^6$-$10^9$ pulses).
4. Spatially and temporally uniform current density to better than +/−10%.

The various cathodes differ in the way the plasma is produced. Initially the cold cathode is covered with local, isolated emitting areas whose density and size depend on the electric field strength, the anode-cathode distance (AK gap), and on the time interval for the electric field to reach its maximum. Each emitting area emits a beam of electrons which is called a beamlet. These isolated emitting areas increase in size with time, thereby increasing the effective area of the cathode and the amplitude of the current. As time progresses the emitting areas join to form a plasma layer on the cathode. The emitted electron beam generated is in most cases non uniform at maximum current.

The cathode plasma, which is of high density and high temperature, expands and eventually fills up the AK gap. The velocity of plasma expansion from the cathode to the anode is between $10^6$ cm/sec-$10^7$ cm/sec. The plasma expansion reduces the cathode-anode distance, resulting in an increase in beam current. The electron beam and the UV radiation emitted from the cathode produce additional plasma at the anode that moves toward the cathode. The two plasmas that move toward each other cause a diode impedance collapse and eventually a diode short circuit.

Some cathodes are thin and lightweight (e.g., a "velvet" cathode has a 0.03 g/cm$^2$ weight per unit area). The plasmas originate from material ablation. For each extracted electron a few atoms are ablated. This ablated material is converted to hot gasses or small debris. The effect is two fold: 1) Even though the total weight of the ablated material is minuscule the accumulated effect of $10^4$-$10^5$ operations (depending on pulse length) can cause the cathode to lose enough of its weight to compromise cathode operation. In that case the cathode has to be replaced or regenerated. 2) The ablated material can spoil the vacuum in which these diodes operate, and thus become a source of plasma that shortens the electron beam pulse. Table 1 summarizes the key parameters of most commonly used high power cathodes. Note that none of these meet all the criteria listed in points 1-5 above.

TABLE 1

| Cathode | V range | Current density | Life time | Pulse duration | Robust | Weight loss/$10^7$ s | Weight g/cm$^2$ | Closure velocity* |
|---|---|---|---|---|---|---|---|---|
| Velvet[1] | >50 kV | Uniform | <$10^5$ | <1 μsec | Fragile | >50% | <0.03 | 0.5 cm/μsec |
| Carbon fibers[2] | >50 kV | Non Uniform | <$10^5$ | <1 μsec | Fragile | >50% | <0.3 | 0.5 cm/μsec |
| Ceramic metal[3] | >100 kV | Non-uniform | <$10^5$ | <0.1 μsec | Fragile | Was not measured | Was not measured | 4.5 cm/μsec |
| ferro-electric[4] | <100 kV | Was not measured | Low | <0.1 μsec | Fragile | Was not measured | Was not measured | Was not measured |

*Results from an experiment performed at Mission Research Corporation (Newington, Va.), November 2001.

5. Fast voltage rise and fall times so as to reduce the slow electron component and minimize electron energy deposition in the thin metal foil.

FIG. 1 illustrates a conventional high power diode. A high voltage, e.g. on the order of 500 kV, is applied to a cold cathode, resulting in what is termed "explosive electron emission", whereby the cold cathode emits a high current electron beam. The application of the high voltage causes the formation of a plasma on the surface of the cathode, and electrons are extracted toward the anode as illustrated. Although many different cathodes have been used for generating intense relativistic electron beams, most operate in this manner, by generating a plasma layer blanketing a negatively pulsed electrode. Electrons are extracted from the plasma and accelerated in the electric field toward the anode.

For a relatively fast voltage rise time, the preferred cathode material for a single shot or a short duration rep-rate operation is velvet. Images (70 ns frame) of a velvet cathode taken through a mesh anode show discrete points of light from dense plasma emitting beamlets of electrons, as shown in FIG. 2. The high density of the discrete emission spots ensures an acceptable uniform emission of electron current density for laser excitation. The relatively good uniformity is mostly due to the low electric field threshold for surface plasma generation ($E_0 \cong 15$ kV/cm) from which the electrons are extracted. This plasma forms by a flashover of velvet's micro-fibers, which are later changed to gas in the post-shot time frame. The low electric field threshold causes many slow electrons to be generated during the voltage rise time. These low-energy electrons deposit much of their energy in the anode foil, shortening its life. One can use an emitter material with higher $E_0$ to reduce the number of slow electrons. Although these materials are more robust, the surface plasma is inherently non-uniform and the variations in current density damage the anode foil and may affect laser excitation.

An electrical circuit representation can aid the understanding of diode operation. The following equations describe cathode performance, qualitatively, during the first ≈100 nsec of a pulsed operation:

$$V = \frac{d(LI)}{dt} + RI, I = k\frac{(V')^{3/2}}{d^2}A, V' = RI, \quad (1)$$

where V is the voltage applied on the diode, V' is the voltage that accelerates the electrons, and I is the total current in the electron beam, i.e. the sum of the currents in all the beamlets. L and R are the parallel combination of the beamlets' inductance and resistance. The AK gap is d, A is the emitting area, and k is a parameter that depends on the geometry of the emitting area. V and V' are not equal since at the initial stage of emission the cathode emits in separate beamlets. The number of beamlets depends on d, the emission threshold electric field, $E_0$, and the electric field rise time, dE/dt. During the pulse, the number of beamlets and their area increases. This makes L, R, k, and A time dependent. The maximum emitting area A is the physical area of the cathode, in which case V=V', R, L, and k become constant, and I is dictated by Child-Langmuir law. During the pulse, cathode plasma expands into the AK gap at a velocity of 0.3-3 cm/µsec (depending on the amount of ablated material), and thus decreases the effective gap distance, d, and increases beam current.

Theory and particle simulations using a particle-in cell (PIC) code MAGIC, described in "Time dependent 3D fully electromagnetic Particle in Cell simulation (PIC)-"MAGIC"", B. Goplen, L. Ludeking, D. Smithe, and G. Warren, *Comp. Phys. Comm.* 87, 54 (1995) (hereinafter "MAGIC"), incorporated herein by reference, suggest that the space charge associated with a single beamlet reduces the surface electric field in an adjacent area. The electric field in the "screened" area is below $E_0$, thus electrons will not be emitted. This non-emitting area can be reduced by decreasing d, by increasing the electric field, and/or choosing a cathode material with a low threshold emission electric field $E_0$. For example, the uniformity of current density to within 1 mm can be achieved using carbon fiber cathodes ($E_0$≈30 kV/cm) in diodes with a cathode electric field of 100 kV/cm only when the AK gap d=2 mm. However such a small AK gap is not feasible for high-power diodes.

A high average power KrF laser, Electra, for inertial fusion energy research, is described in "Pulsed Power for Rep-Rate, Electron beam Pumped KrF Laser", Sethian, J. D., Myers, M., Smith, I. D., Carboni, V., Kishi, J., Morton, D., Pearce, J., Bowen, B., Schlitt, L., Barr, O., and Webster, W., *IEEE Trans. Plasma Sci.*, Vol. 28, 1333 (2000), incorporated herein by reference. The system produces a 500 keV, 100 kA, 150 nanosecond electron beam at repetition rate of 5 Hz. For inertial fusion energy applications, the system should run reliably for $3 \times 10^8$ shots. A velvet cathode used for a single shot pulse deteriorates (approximately) after 10,000 shots at 5 Hz repetition rate. Therefore a new diode is required with the following characteristics:

1. It must be durable enough to operate continuously under a 5 Hz rep-rate.
2. The electron emission has to be spatially and temporally uniform throughout the pulse duration and reproducible during operation so as to achieve a uniform and consistent energy deposition in the laser gas.
3. There must be little plasma and neutral gas emission i.e., very slow anode cathode gap closure.
4. Low energy electron emission must be minimized i.e., fast current rise and fall times.
5. It must be stable against the transit time instability (see, e.g., "Stability of space-charge limited electron flow" T. M. Antosen, Jr., W. h. Miner, E. Ott, and A. T. Drobot, *Phys. Fluids* V. 27, p. 1257 (1984).
6. Must be able to mitigate beam edge/halo effects at 5 Hz (see, e.g., "Studies of enhanced edge emission of a large area cathode" F. Hegeler, M. Friedman, M. C. Myers, J. D. Sethian, and S. B. Swanekamp, *Phys. Plasmas*, V. 9, p. 4309 (2002).

It is therefore desirable to provide a more robust high power diode having a longer lifetime than conventional diodes, while performing over a broad range of operating conditions and operating parameters.

SUMMARY OF THE INVENTION

According to the invention, a high power diode includes a cathode for emitting a primary electron discharge, an anode, and a porous dielectric layer, e.g. a honeycomb ceramic, positioned between the cathode and the anode for receiving the primary electron discharge and emitting a secondary electron discharge.

Also according to the invention, a method of generating a high current electron beam includes applying a voltage to the diode to thereby generate the electron beam.

Advantages of some of the preferred embodiments of the invention are that the diode can operate at voltages 50 kV and higher while generating an electron beam with a uniform current density in the range from 1 A/cm² to >10 kA/cm² throughout the area of the cathode. It is capable of repetitively pulsed operation with pulse duration from a few nanoseconds to more than a microsecond, while the total number of pulses can be >$10^7$ pulses. The diode generates minimal out-gassing or debris, i.e. with minimal ablation, providing a greater diode lifetime, and can operate in a high vacuum environment of $10^{-4}$ Torr. The area of the cathode can range from between <1 cm² to >2 m². In principal, the diode can operate in an external magnetic field or in magnetic field-free region.

The high power diode is useful in many applications requiring a high current electron beam. Exemplary applications include x-ray photography of large samples, polymerization processes, sterilization of biological and chemical agents, irradiation of food, and as a pump for lasers, e.g. excimer lasers such as krypton fluorine (KrF) lasers.

Additional features and advantages of the present invention will be set forth in, or be apparent from, the detailed description of preferred embodiments which follows.

BRIEF DESCRIPTION OF THE DRAWINGS

FIG. 15a shows the RF noise associated with the instability. FIG. 15b shows the suppression of the instability by including the ceramic honeycomb.

DETAILED DESCRIPTION OF THE PREFERRED EMBODIMENTS

Figure 1:
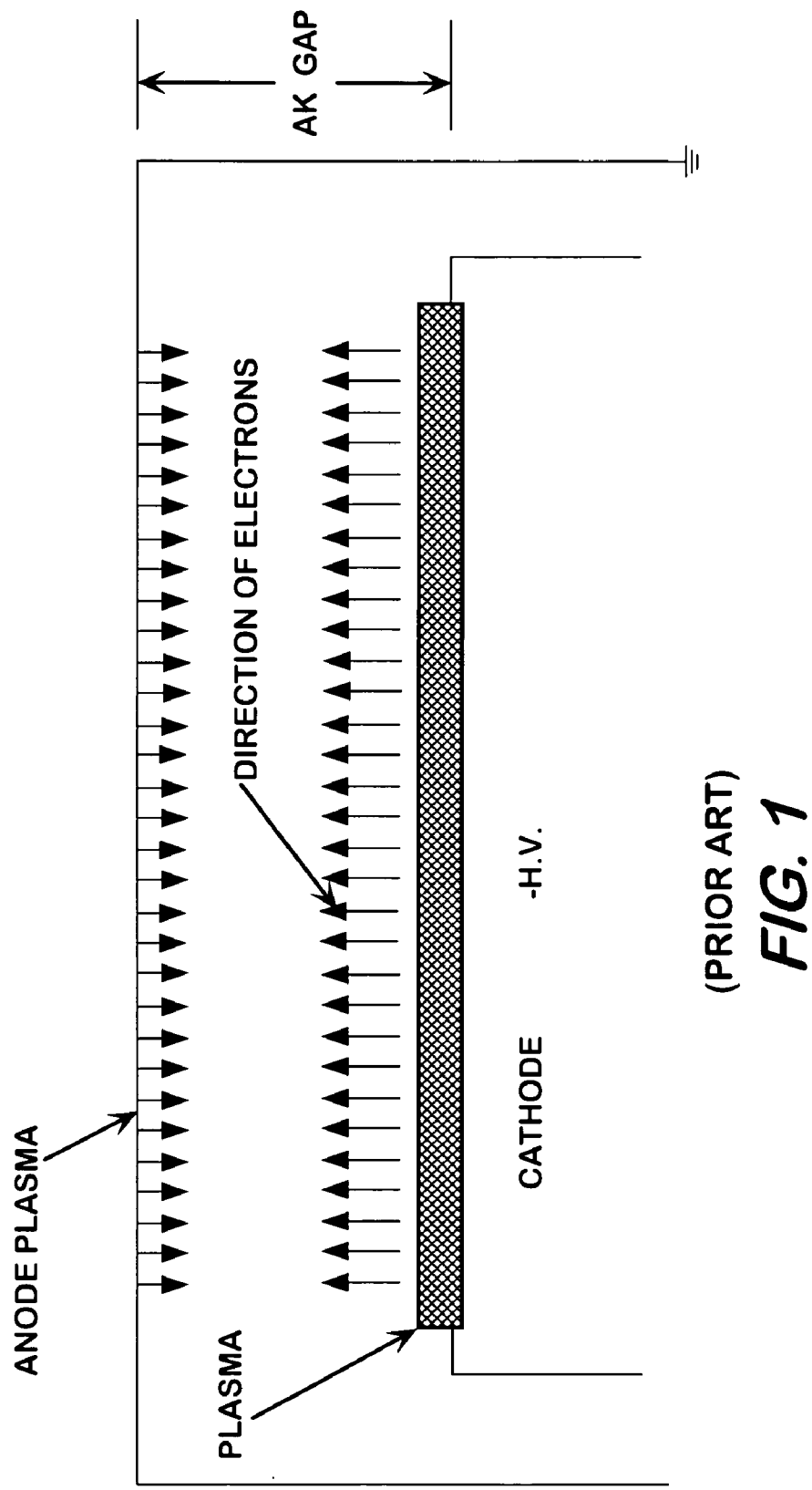
FIG. 1 is a schematic diagram of a prior art high power diode.
Figure 2:
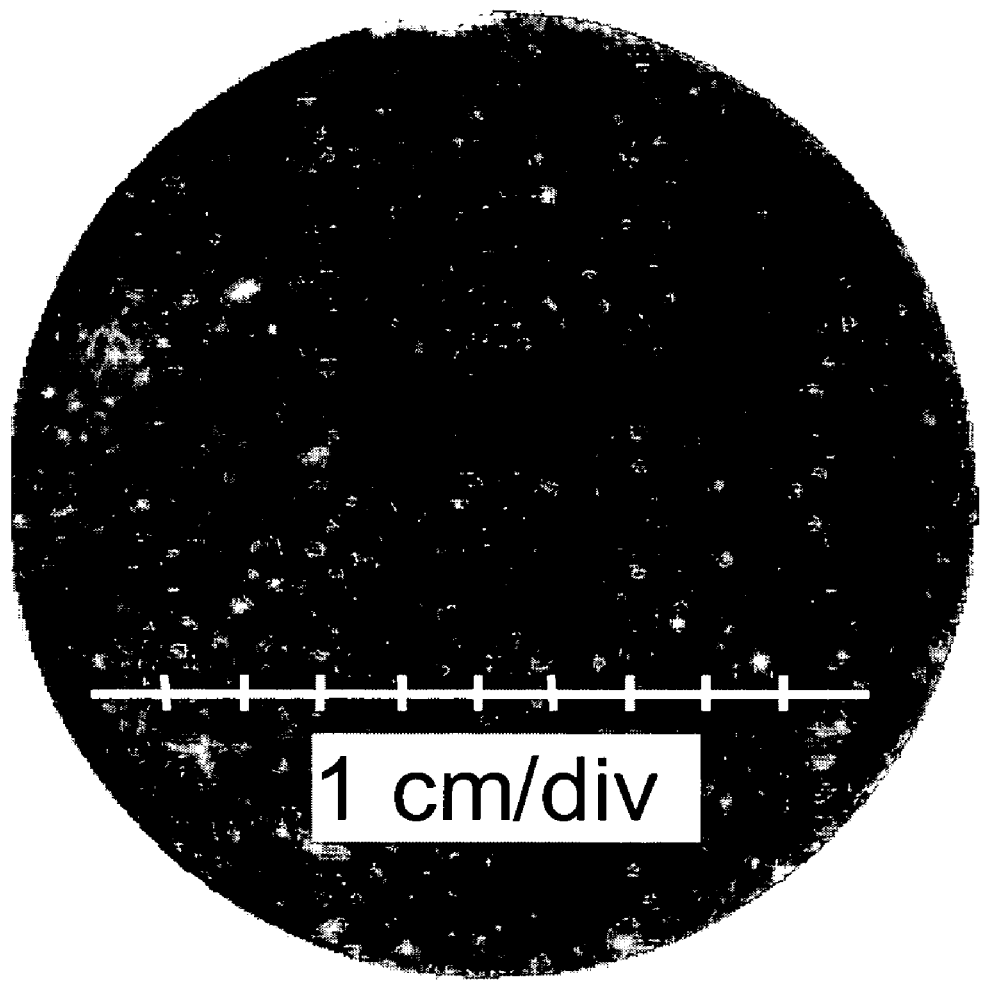
FIG. 2 shows an image (70 ns frame) of a prior art velvet cathode taken through a mesh anode illustrating the discrete points of light from a dense plasma emitting beamlets of electrons.
Figures 3A, 3B:
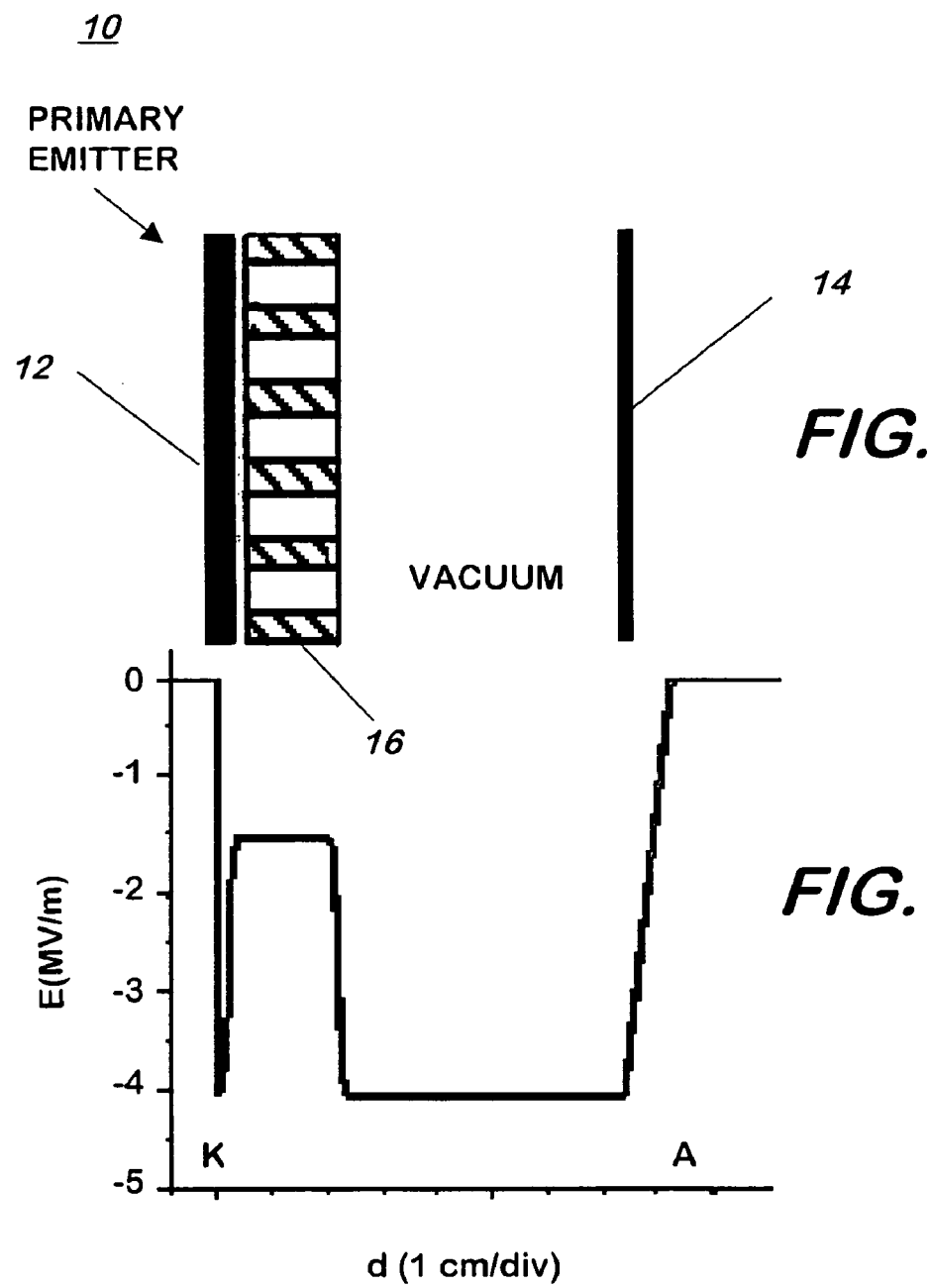
FIG. 3*a* is a schematic diagram of a high power diode according to the invention.
FIG. 3*b* shows its electric field distribution across the AK gap prior to emission.
Figure 4:
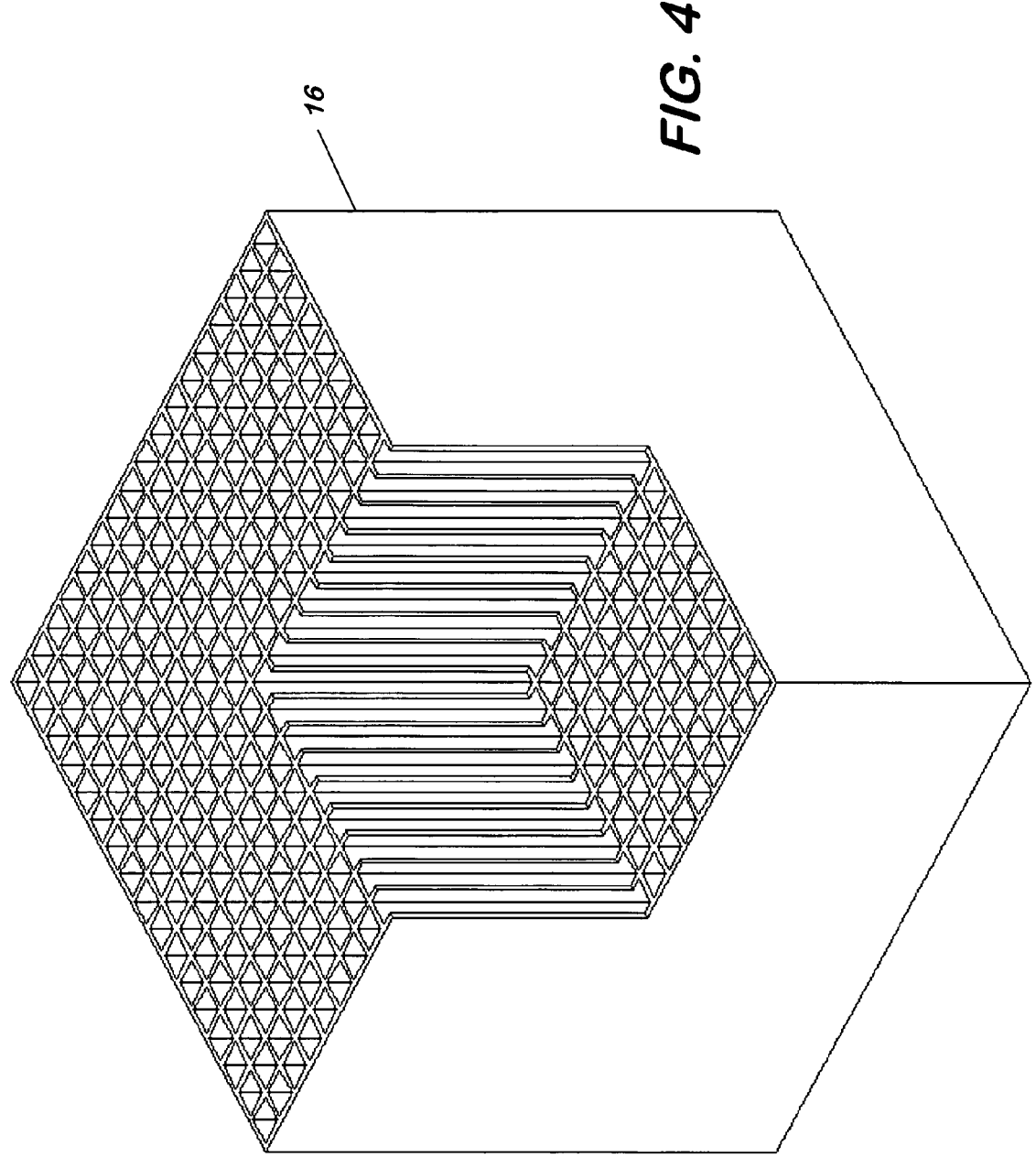
FIG. 4 is a perspective view of a honeycomb ceramic layer partially cut away to show the interior of the honeycomb configuration according to the invention.

Referring now to FIG. 3a, a high power diode 10 includes a cathode 12 (the "primary emitter" as indicated), an anode 14, and a porous dielectric layer 16 spaced a selected distance from the cathode 12. Preferred cathode 12 materials include velvet, carbon fiber, and carbon cloth. Layer 16 is preferably a honeycomb ceramic as illustrated in FIG. 4.

Referring to FIG. 3a, a honeycomb slab is placed 2 mm above the emitter and supported by ceramic spacers at the edges. A suitable honeycomb material is cordierite with the bulk material dielectric constant of 6.3. The honeycomb consists of square pores with a pore size of 1.2 mm×1.2 mm with a wall thickness of about 0.2 mm. Honeycomb slabs of thickness of 2 cm and 5 cm were tested. The anode is placed about 5 cm away from the surface of the ceramic. FIG. 3b shows the axial electric field distribution across the diode for a slab 2 cm thick obtained from particle in cell (PIC) simulations (MAGIC, see above). This figure shows that the electric field intensity on the cathode is not affected by the presence of the honeycomb and that the effective dielectric constant of the honeycomb ceramic (bulk material plus pores) is ≈2. The PIC simulations also suggest that the region between the cathode and the ceramic can be looked as a "mini" diode with an AK distance of 2 mm. With an AK gap of 2 mm one can replace the velvet with a material having a higher $E_0$ such as carbon fiber and still achieve uniform electron emission. Electron emission will start now at a higher diode voltage, reducing the number of slow electrons reaching the anode.

Figure 5:
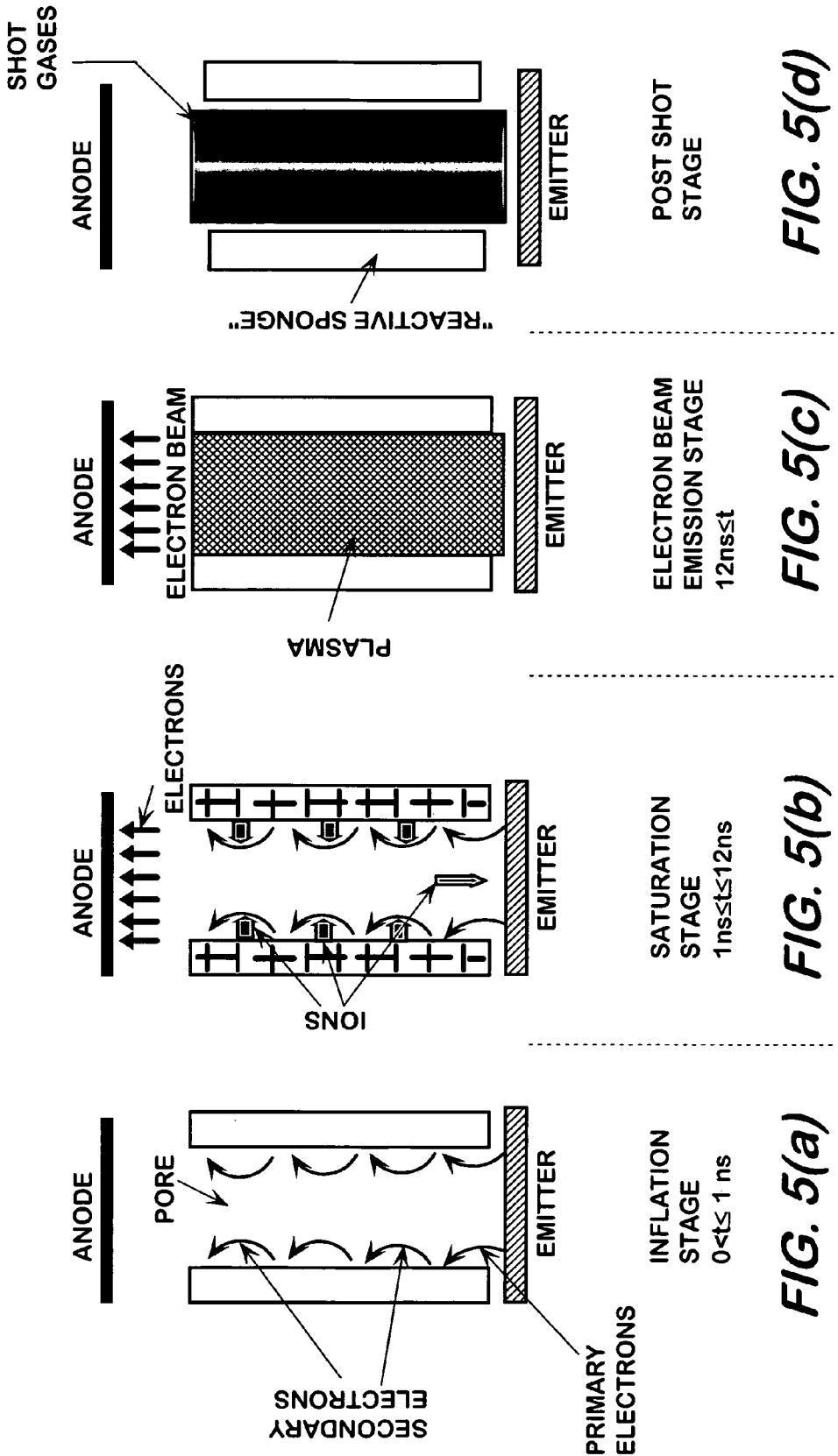
FIGS. 5a-d show the stages during operation of a diode illustrating a ceramic honeycomb mechanism according to the invention.

The simulations show emission of (primary) electrons from the cathode. These electrons gain energy from the field and most of them hit the inside of the ceramic pores releasing secondary electrons, as shown in FIG. 5a. Ceramic-like materials typically have a high secondary emission coefficient (see, e.g., "Secondary Electron Emission", V. Baglin, Y. Bozhko, O. Grobner, B. Henrist, N. Hilleret, C. Scheueriein and M. Taborelli, *CERN CLIC Structure Working Group* (2000)). The number of secondary electrons, $\delta(\epsilon)=\delta_0 \times f(\epsilon)$ released from ceramic by a single primary electron depends on its energy, $\epsilon$, where $f(\epsilon)$ is a function that depends on the material $\delta(\epsilon)>1$ if the energy of the primary electron falls between two energies, $\epsilon_1$ and $\epsilon_2$. The secondary electrons traverse a distance <0.5 mm before intersecting the ceramic walls gaining energy from the applied field. If this energy falls between $\epsilon_1$ and $\epsilon_2$ a third generation of electrons are ejected from the wall. The process continues as long as the energy limits are held. With a pore length of 2 cm, one can expect that 10-20 generations of electrons would be created. This mechanism leads to an avalanche process in which a single primary electron ejects about a million secondary electrons (assuming $\delta_0=2$). Even though $\delta_0$ can be as high as 10 for some ceramic like materials. $\delta_0=2$, $\epsilon_1=200$ eV, and $\epsilon_2=4$ keV were used in the simulations to get a reasonable fast convergence while maintaining an avalanched emission process.

Figure 6:
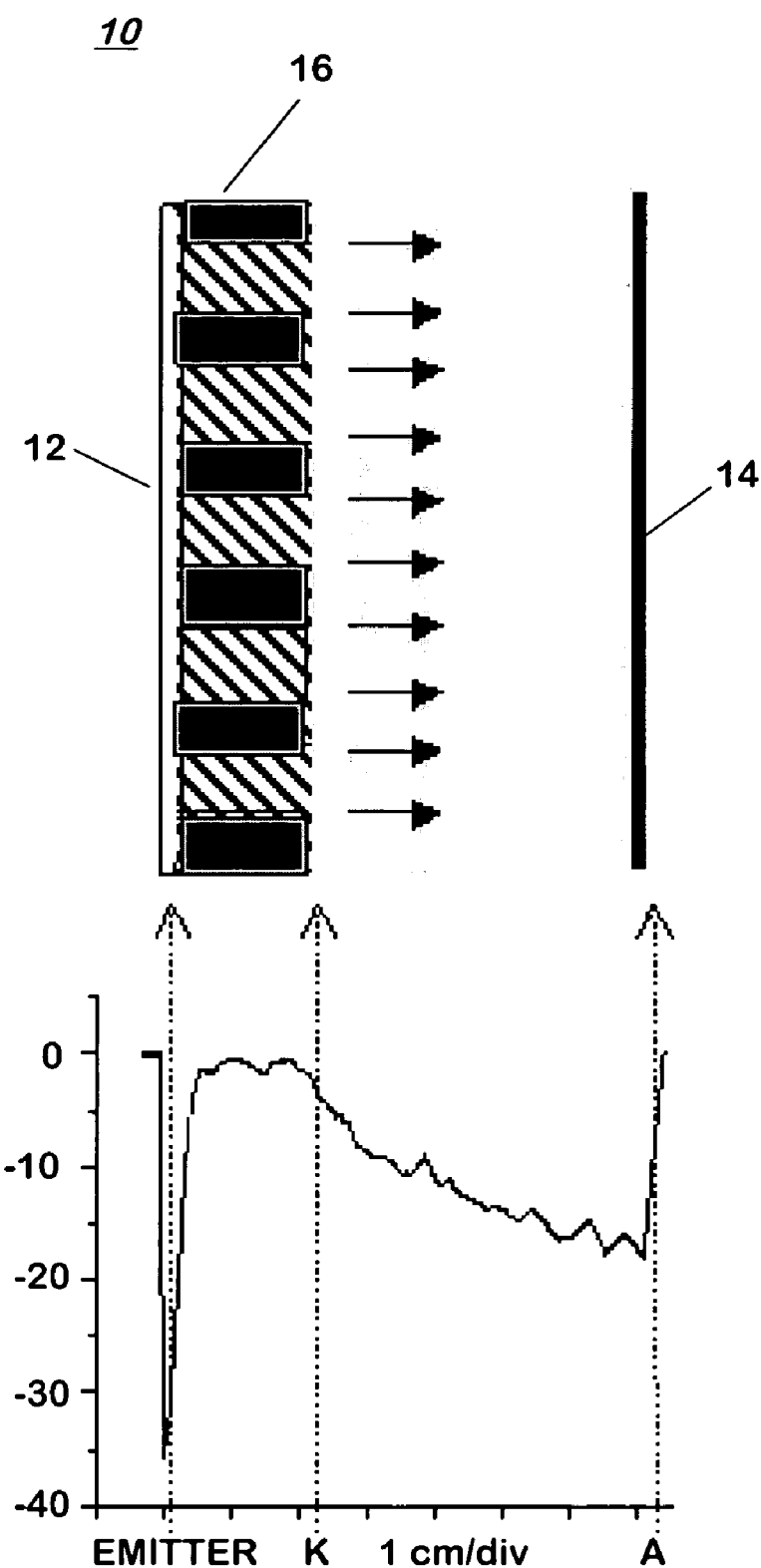
FIG. 6 shows the electric field profile across a diode during electron emission according to the invention.

About one nanosecond after emission starts, the inflation stage ends and the second stage, the saturation stage, starts, as shown in FIG. 5b. During this stage the ceramic pores are filled with electrons and the ceramic walls are positively charged. This creates a potential barrier that reflects additional secondary electrons back to the wall where they are mostly absorbed. The primary and the secondary electrons impact on the ceramic pores releasing adsorbed gases that are residing in the ceramic walls and ionizing them. The positive charge is then depleted either by ions (assumed to be protons) that are emitted into the pores or by surface current due to the increased wall conductivity. The ions move slowly toward the cathode surface enhancing the electric field on the cathode and reducing the electric field inside the pores, as shown in FIG. 6. The reduction of the electric field along the ceramic pores quenches the electron avalanching. The proximity (2 mm) of the positively charged ceramic to the emitting area boosts the electric field on the cathode at a faster rate than what could be achieved without the honeycomb ceramic. This fast-rising, high electric field on the cathode enhances the density of beamlets and shortens the time it takes the plasma to cover the cathode uniformly.

When the ions and the plasma from the ceramic reach the emitting area ≈12 nsec after emission starts, the last stage starts. At this time, the cathode and the ceramic are connected electrically. Electrons within the ceramic can now be extracted and accelerated toward the anode without leaving the ceramic positively charged, as shown in FIG. 5c. During this phase, the current density and the electric field distribution obey the Child-Langmuir law with the effective AK distance d being the ceramic to anode distance.

Cathode tests were carried out on the repetitively pulsed power system of Electra. The diode was immersed in a 1.4 kG magnetic field and was pumped by two 8" cryogenic pumps each: 2500 l/s $H_2$, 1500 l/s air and 4000 l/s water. As a baseline for the experimental research three cathode materials were tested in ceramic free diodes:

1. Velvet is a material that can satisfy many of the requirements, but is not durable enough for repetitive applications. Velvet starts to emit at electric field amplitude of $E_0 \approx 15$ kV/cm.

2. Carbon fiber is more robust than velvet with $E_0 \approx 30$ kV/cm but does not emit as uniformly as velvet.

3. Carbon cloth starts to emit at high electric field $E_0 \approx 70$ kV/cm. This material is more robust than carbon fiber but, owing to the relatively high $E_0$, has very non uniform emission.

Figures 7A, 7B:
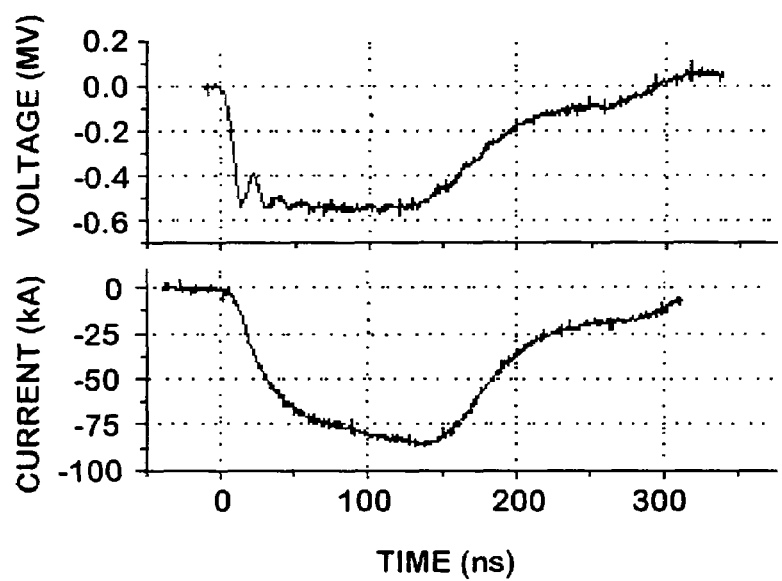
FIGS. 7a and 7b are voltage and current traces, respectively, for a carbon fiber emitter serving as a cathode.

A voltage pulse of 500 kV was applied to a 27 cm×97 cm cathode with an AK gap=5.8 cm. The voltage pulse has a 10%-90% rise time of 20 nsec, a flat top of 120 nsec and a fall time of 50 nsec. FIGS. 7a and b show a typical voltage and current trace, respectively, measured 10 cm upstream of the cathode for a carbon fiber cathode. Note that the total current signal is governed during the first 10 ns-20 ns by the time it takes for the voltage pulse to traverse the diode and, as such, gives a diffuse picture of the emission process.

Figure 8A:
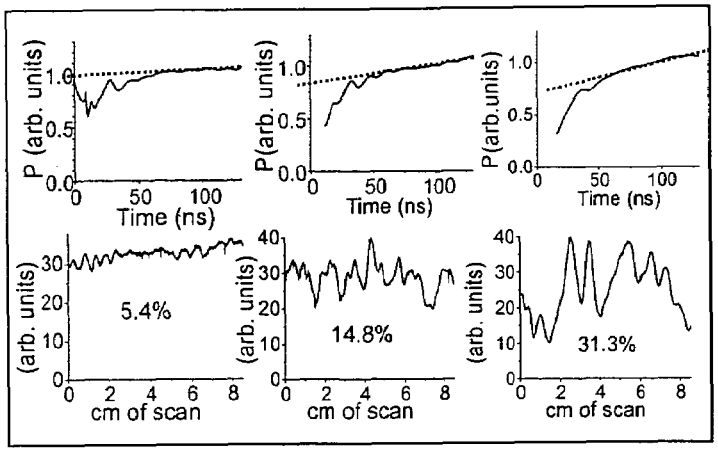
FIGS. 8a and 8b are graphs for different electron emitter materials comparing prior art diode performance (FIG. 8a) with diode performance according to the invention (FIG. 8b).

The local beam current, I, was measured with a small area Faraday cup. The local current rise time varied for each of these cathodes, but the peak local current amplitude at the end of the pulse was the same within 10%. FIG. 8a shows both the diode-normalized perveance $P=I/V^{3/2}$ as a function of time (top) and a densitometer scan of a radiachromic film (bottom) that was placed at the anode position. The dashed line is the asymptotic value of P at the end of the pulse, while the % of inhomogeneity is indicated as shown. Because the film transparency responds preferentially to lower energy electrons, it gives only a qualitative time integrated picture of beam uniformity. It is evident that the spatial non-uniformity in beam density (due to the beamlets) and the rise time of P (i.e., how fast L, R, A and k in Eq. 1 reach equilibrium) depends on the value of the threshold electric field $E_0$. The greatest beam uniformity and the fastest rise to an equilibrium P, are from best to worst: velvet, carbon fiber, and carbon cloth.

Figure 8B:
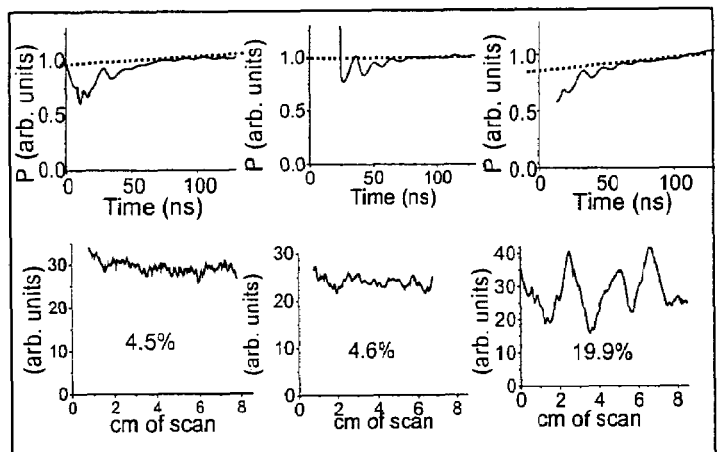

Suspending a 2 cm thick ceramic honeycomb 2 mm away from the various cathodes show large improvements in diode performance. It was found that, for any emitting material, the honeycomb ceramic causes P to reach its maximum value earlier and that the beam imprint on radiachromic film was more uniform, as shown in FIG. 8b. Based on the simulations, it is thought that the ceramic honeycomb enhances the density of beamlets and increases the area they occupy on the cathode causing L, R, A, and k in Eq. 1 to reach the equilibrium values earlier. A better beam uniformity using a carbon cloth cathode (with the highest value of $E_0$) can be obtained if the ceramic-cathode gap was smaller than 2 mm. However, such a small gap is not practical for these large-area cathodes.

Figure 9:
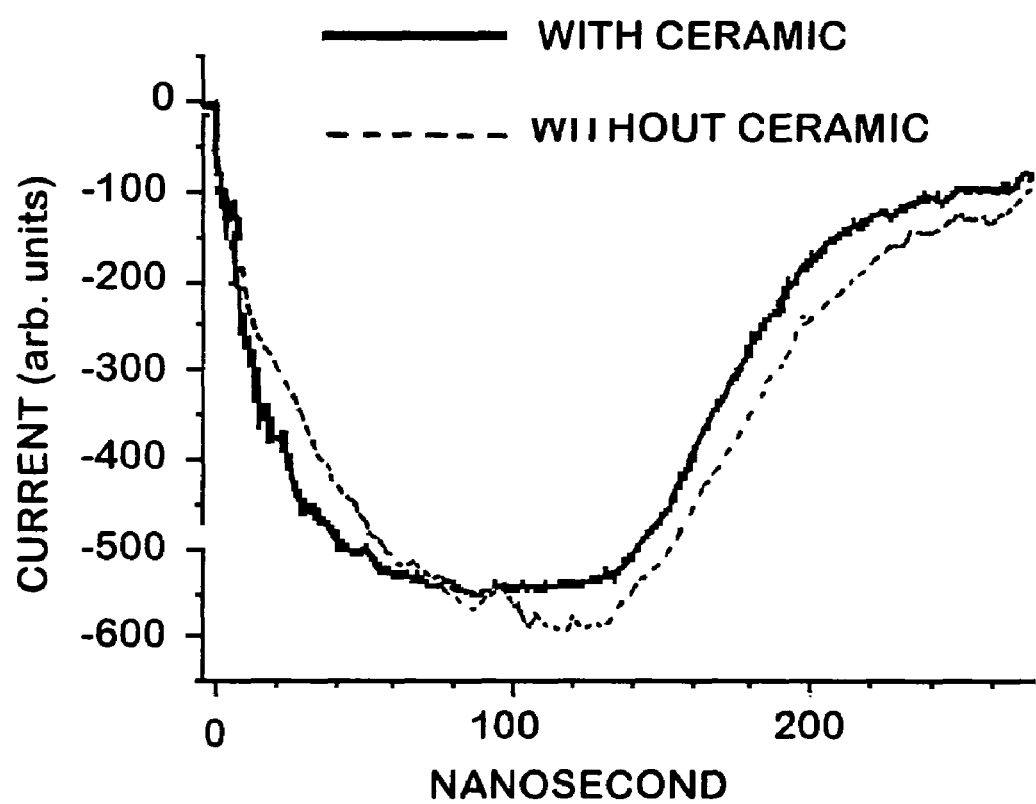
FIG. 9 compares beam current traces for a carbon fiber cathode with and without a ceramic honeycomb.

FIG. 9 shows the Faraday cup signals of the beam generated from a carbon fiber cathode with and without a ceramic honeycomb. Note that the current rise and fall times are faster with the ceramic insert. One explanation for the fast fall time is that there are electron and ion currents inside the pores. Because of its high mass, the ions can not respond fast enough when the pulsed voltage drops, thus creating an electric field counteracting the electron flow.

The reduction in the number of low energy electrons due to the fast current rise time and fall time is confirmed by comparing the opacity of radiachromic films that are exposed by the beams of similar current density from different cathodes. The radiachromic films used with the carbon fiber-ceramic combination show a 40% reduction in the opacity in comparison with velvet cathodes. Since film transparency increases with electron energy for the same charge and since the currents for the different diode configurations are unchanged, we conclude that inserting the ceramic honeycomb in the diode reduces the number of low-energy electrons.

Figure 10:
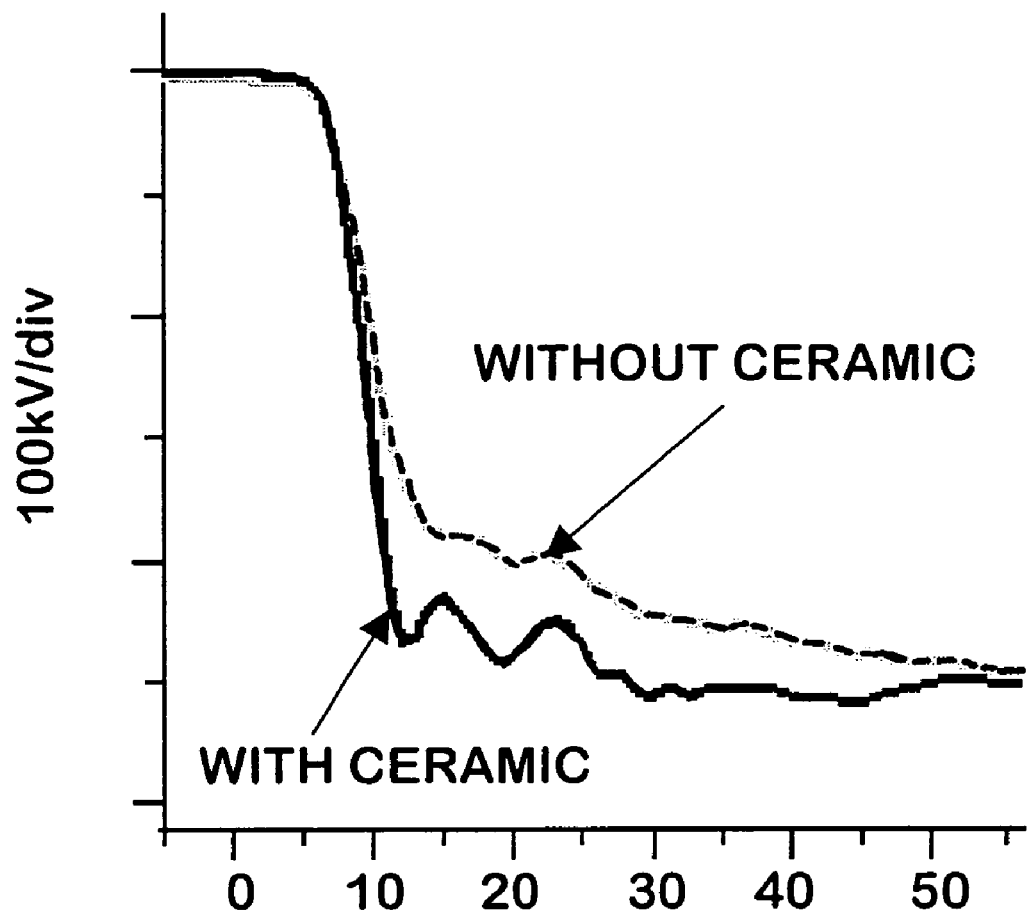
FIG. 10 compares the first 50 ns of the integrated E-dot traces for a carbon fiber cathode with and without a ceramic honeycomb.

An E-dot probe located in the diode external wall opposite the cathode witnessed the fast change of the electric field distribution inside the ceramic predicted by the simulation. This probe was connected to an oscilloscope with a 3-GHz bandwidth. The signals were integrated numerically. FIG. 10 shows a faster E-dot signal rise time for a diode contained the ceramic honeycomb. The decrease in the rise time can be attributed to the electric field collapse inside the ceramic and the increased electric field near the cathode.

Figure 11:
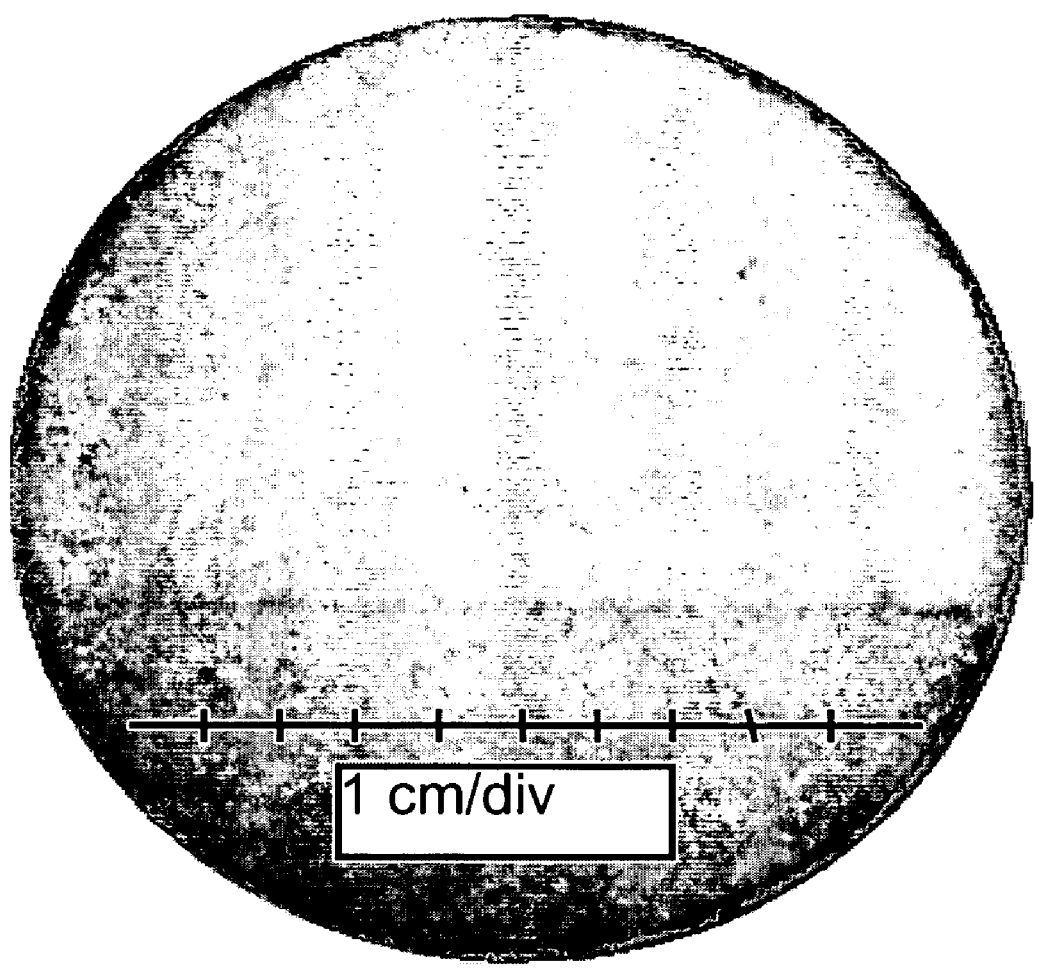
FIG. 11 is an image (70 ns frame) of a 10 cm diameter circular area of a ceramic honeycomb emitting area according to the invention.

FIG. 11 shows an image (70 ns frame) of the emitting surface of the honeycomb ceramic taken through a mesh anode. Unlike the velvet cathodes no discrete emission spots were detected. The surface shows a uniform emission of light that starts at the beginning of the pulse and ends at the end of the voltage pulse. Since the dense plasma inside the pores has small solid angle to escape into the empty diode region we believe that this light is a byproduct of electrons hitting the ceramic (luminescence).

The amount of gas emitted into the diode during a single pulse, or the amount accumulated during repetitively pulsed operation, can affect diode performance and longevity. These gases are evolved from the cathode, the graphite beam dump (anode) and from the ceramic honeycomb when present. The diode pressure was measured when it reached a steady state that typically occurs after 50 pulses at a rep-rate of 0.1 Hz. The pressure rise for the ceramic-free diode with velvet, carbon fiber, or carbon cloth cathodes was $2\times10^{-5}$ Torr, $3.8\times10^{-5}$ Torr and $3.6\times10^{-5}$ Torr respectively. Inserting a 2 cm thick ceramic honeycomb in the diode reduces the pressure rise for velvet and carbon fiber cathodes to $1.4\times10^{-5}$ Torr and $2.4\times10^{-5}$ Torr respectively. No effect on diode pressure was detected when the ceramic was used with carbon cloth cathode. It is thought that there is a competition between the following processes:

1. As long as (the normalized perveance) P keeps rising more beamlets are generated which necessitates continued plasma formation (carbon cloth cathode). If P reaches equilibrium earlier in the pulse (velvet and carbon fiber cathodes) no more plasma generation is needed later.
2. The gases inside the ceramic are in close contact with the walls of the pores and are reabsorbed. The assumption about absorption of gases by the ceramic (FIG. 5d) was confirmed when using a ceramic honeycomb slab coated with gamma-alumina, increasing the ceramic surface-area by many orders of magnitude. The gamma-alumina acts like a "reactive sponge" for hydrogen, oxygen atoms and water molecules (see, e.g., "Hydrogen and the Structure of the Transition Aluminas", Karl Sohlberg, Stephen J. Pennycook and Sokrates T. Pantelides, *J. Am. Chem. Soc.*, Vol. 121, 7493 (1999)). Using a carbon fiber emitter, the diode pressure rose only $0.7\times10^{-5}$ Torr, after 50 shots at 0.1 Hz, which is a reduction of a factor of five. Hence, more of the adsorbed gases from the cathode and the ceramic are "recycled". The application of gamma-alumina on the ceramic honeycomb did not change the beam spatial and temporal uniformity obtained with the uncoated ceramic.

Figure 12A:
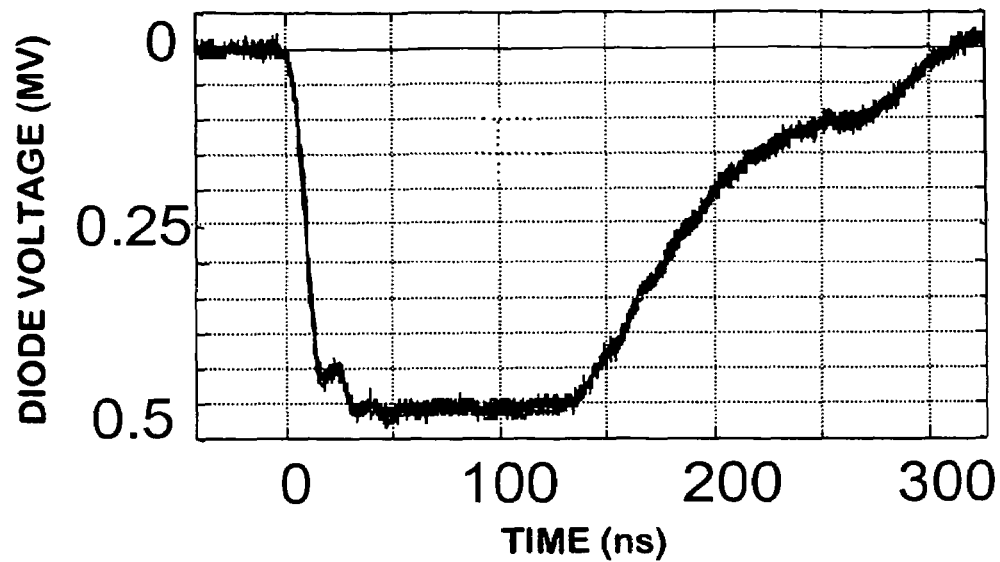
FIGS. 12a and 12b compare superimposed voltage traces for different shot number runs for a honeycomb diode according to the invention (FIG. 12a) and for a velvet cathode (FIG. 12b).
Figure 12B:
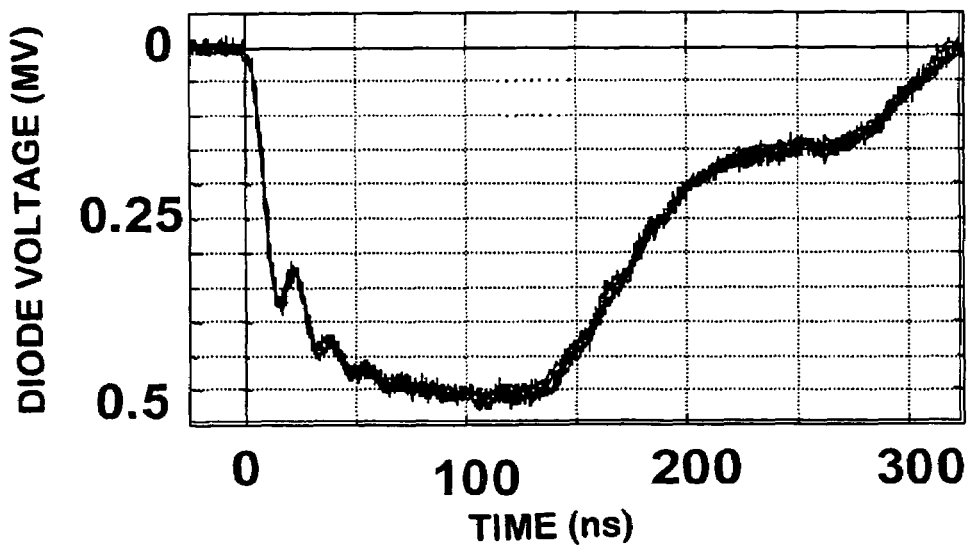
Figure 13A:
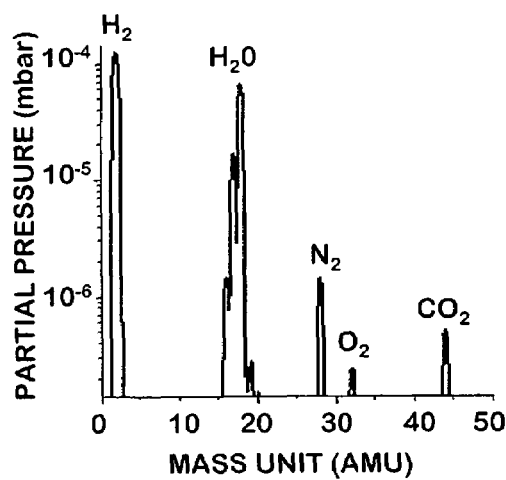
FIGS. 13a-d Show gas pressures and composition durig sustain operation of diodes with and without a ceramic honeycomb.
Figure 13B:
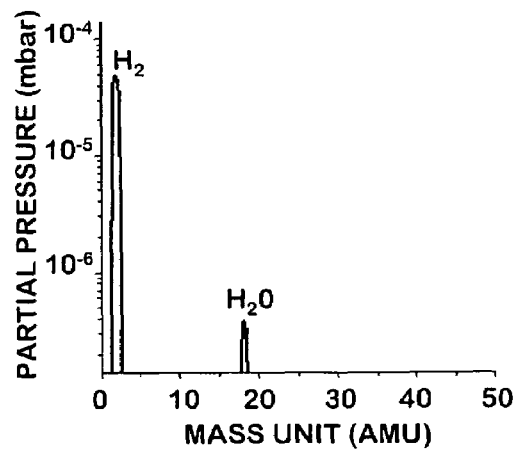
Figure 13C:
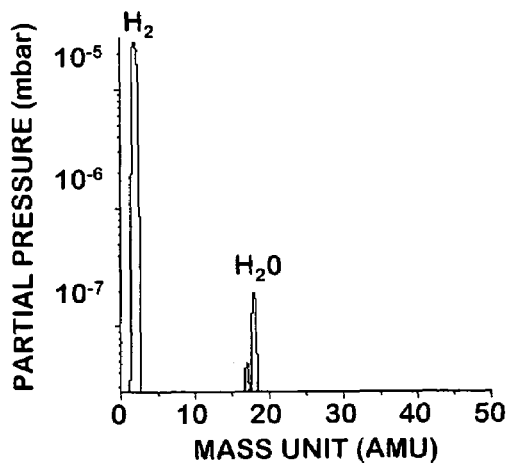
Figure 13D:
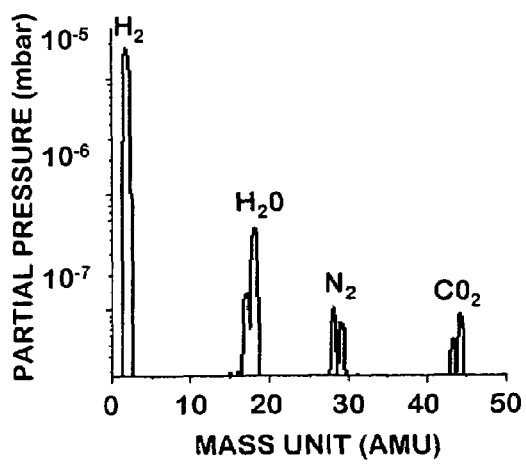

The amount of gases emitted increases with the rep-rate and when the thickness of the honeycomb ceramic is changed from 2 cm to 5 cm. However there was no change in the electrical behavior of the diode. The diode was subjected to 5 consecutive runs each of 10,000 pulses at 1 Hz. In FIG. 12a the voltage traces of a honeycomb ceramic diode of shot number 100, 10,000, 20,000, 30,000, 40,000, 50,000 are superimposed, showing excellent reproducibility. As a comparison, FIG. 12b displays superimposed voltage traces of a velvet cathode of shots 10,000, 20,000, 30,000, 40,000, and 50,000 showing the same excellent reproducibility as the honeycomb ceramic diode but not a flat-topped voltage.

During operation of the diode, samples of the evolved gases were collected and analyzed. Results for shot 10,000 and 50,000 are shown in FIGS. 13a-d. Most of the gas in the diode was hydrogen. The pressure raises during the first 20,000 shots but drops to its initial value by the 50,000 shot. Water and air components decline throughout the run. The amount of carbon and carbon components were small and declined during the operation. These results agree with the "reactive sponge" model of the gamma alumina. Although a velvet cathode produced about 2.5 times less gasses at 1 Hz operation, the percentage loss of material from the velvet is an order of magnitude larger then the percentage material loss of the honeycomb ceramic indicating longer durability for the honeycomb ceramic diode.

The honeycomb ceramic diode was also tested at 5 Hz for about 8000 shots. The pressure in the diode rose during the first 1500 shots and then leveled off at 1.3 milli-Torr for the rest of the run. The ceramic honeycomb and the cathode were undamaged at the end of both the 1 Hz and 5 Hz runs while the velvet cathode material of a honeycomb ceramic-free diode was severely compromised after 50,000 shots at 1 Hz.

The electron current density (40 A/cm$^2$) measured in the experiment and the voltage drop on the ceramic (less than 20 kV) that was obtained from the simulation indicate that the energy absorbed per pulse by the ceramic honeycomb is <0.1 J/cm$^2$. Under a 1-5 Hz rep-rated operation this energy can accumulate raising the ceramic temperature, however radiation losses limits the temperature rise to few hundred degrees centigrade. The ceramic honeycomb can get hot without affecting the electrical characteristics of the diode.

Figure 14:
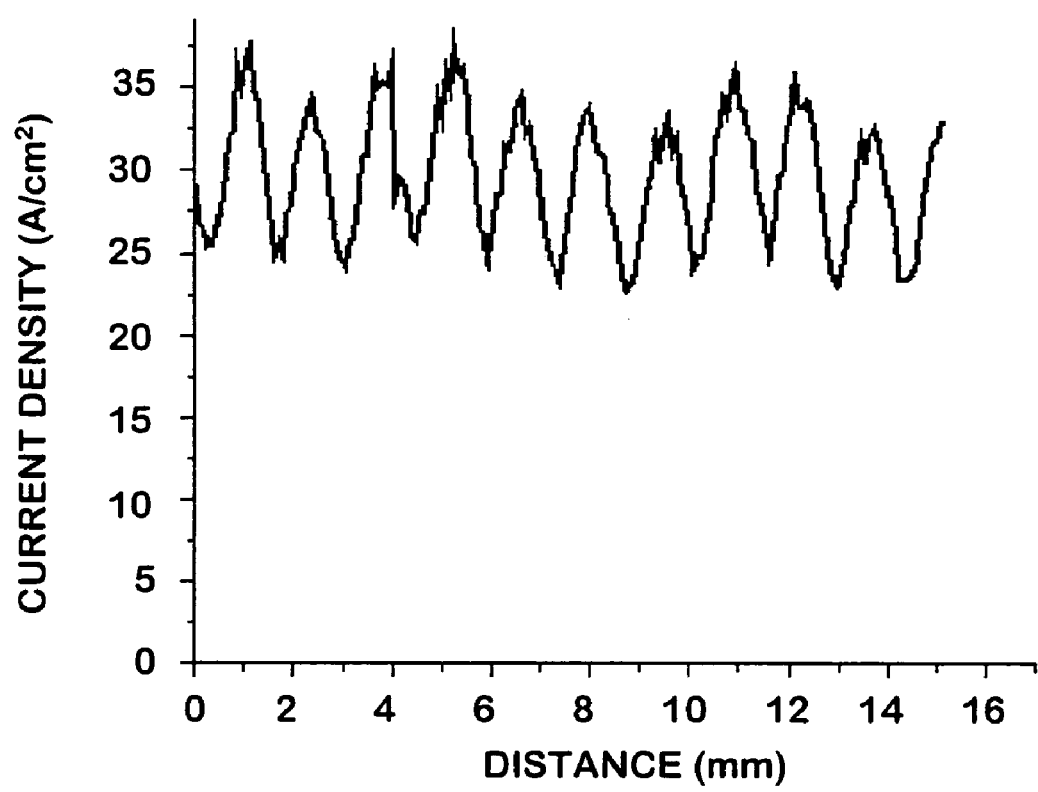
FIG. 14 is a linear scan of radiachromic film exposed at the middle of the anode using a velvet cathode and ceramic honeycomb according to the invention.

The beam electron transverse energy can be estimated from a radiacromic film exposure taken at the center of anode. From this image the current density variation was resolved across a single pore. (A linear scan is shown in FIG. 14). To obtain such a resolution, the electron Larmor radius has to be at most a quarter of a pore size i.e., 0.3 mm. From the size of the Larmor radius one can calculate the transverse energy of an "average" electron at the anode to be less than 100 eV.

The ceramic honeycomb was weighed before and after each run to estimate the amount of material lost under repetitive operation. The amount of material loss was below our measurement capability of 10 mg for a 280 g, 15 cm×15 cm honeycomb sample subjected to 3500 pulses of 500 kV. Each pulse of duration was of 140 nanoseconds and the current density of 30 A/cm$^2$. Therefore, the weight loss is expected to be less than 10% for $10^7$ shots.

The electron beam emitted from a flat cathode contains a beam halo with a >3:1 enhanced current density. The beam halo is expected to damage the anode foil and/or lead to nonuniform excitation of the KrF gas. The beam halo results from the discontinuity in the applied axial electric field at the emitting and non-emitting areas on the cathode (i.e., the beam edge). Contouring the emitting area by gradual reduction of the thickness of the honeycomb ceramic at the edges mitigates the discontinuity effect of the electric field. It produces smoother electric field intensity on the emitting surface greatly reducing the enhanced electron emission.

Space-charge-limited flow in large-area planar diodes is susceptible to the transit time instability. It converts 10% of electron energy into RF and it introduces a large spread in the electron energy emerging from the diode. This energy spread leads to enhanced energy deposition in the foils that separate the electron-beam diode from the KrF gas chamber and is responsible for most of the reduced efficiency of KrF lasers. It may also lead to spatial and temporal non-uniformity in the laser output.

Early work demonstrated that the effect of the instability can be mitigated by slotting the cathode surface in both dimensions with parallel grooves of predetermined depth and periodicity creating a slow wave structure. Waves associated with the instability were slowed down and highly attenuated and the instability was quenched. However the emerging electron beam was, of course, spatially modulated.

We have found that the instability can also be suppressed with the ceramic honeycomb insertion in front of the emitting surface. The presence of dielectric in the AK gap prevents the electromagnetic waves of the TEM mode associated with the instability from propagating.

Following the procedure outlined in "Foundation for microwave engineering" by R. E. Collin (McGraw Hill, N.Y., 1992), we investigated theoretically a parallel plate transmission line partially filled with dielectric material (ceramic honeycomb) having a transmission line partially filled with dielectric material (ceramic honeycomb) having a permittivity=2.0. The plates are infinitely wide and the dielectric slab rests on one of the plates. No electrons are present between the parallel plates.

Solving the Helmholtz equation with boundary condition at the dielectric vacuum interface one gets the dispersion relation $$l_0 \tan(l_0 a) = \epsilon p_0 \tan h(p_0(b-a))$$

$$l_0^2 + p_0^3 = (\epsilon - 1)k_0^2 \qquad (2)$$

$$\beta = \sqrt{k_0^2 + p_0^2} \quad k_0 = \omega/c$$

Where $l_0$ and $p_0$ are parameters from Helmholtz equations and $\beta$ is the propagation constant. From these equations one gets the effective dielectric constant of the transmission line The electric field components (parallel ($E_z$) and perpendicular ($E_y$) to the dielectric) can be approximated at the RF frequency associated with the instability f=4 GHz to be $$E_{z,y} \propto \sin(l_0 y) \text{ for } 0 \leq y \leq a$$

and $$E_{z,y} \propto \sin(l_0 a) \exp[-p_0(y-a)] \text{ for } a \leq y \leq b,$$

where a is the ceramic slab thickness (measured from the cathode) and b is the AK gap. The field decays exponentially away from the vacuum dielectric surface. This wave is a surface wave with small electric field amplitude at the anode. Assuming that this picture also holds when electrons are emitted from the cathode, RF surface waves do not couple well with the beam and do not extract energy from the electrons at the vicinity of the anode to feed the instability. FIGS. 15*a* and *b* respectively show the RF (associated with the transit time instability) in a ceramic free Electra diode and the RF in a similar diode with a ceramic honeycomb insert. The noise was reduced by a factor of 150 in the honeycomb ceramic diode.

Obviously many modifications and variations of the present invention are possible in the light of the above teachings. It is therefore to be understood that the scope of the invention should be determined by referring to the following appended claims.

We claim:

1. A high power diode, comprising:
    a cathode for emitting a primary electron discharge operable at an applied voltage of at least 50 KV;
    an anode; and
    a porous dielectric layer positioned between the cathode and the anode and spaced apart from the cathode to form a gap therebetween for receiving the primary electron discharge and generating a secondary electron emission in the dielectric layer.

2. A diode as in claim 1, wherein the area of the cathode is in the range of from about 1 cm$^2$ and about 2 m$^2$, and wherein the porous dielectric layer is about the same area as the cathode and is positioned in alignment therewith.

3. A diode as in claim 1, wherein the porous dielectric is a ceramic.

4. A diode as in claim 3, wherein the cathode is an array selected from the group consisting of carbon fibers and velvet cloth.

5. A diode as in claim 3, wherein the cathode is a carbon cloth.

6. A diode as in claim 3, wherein the ceramic has a dielectric constant of about 6.

7. A diode as in claim 3, wherein the ceramic is cordierite and further includes a dielectric non-organic surface layer.

8. A diode as in claim 7, wherein the surface layer is gamma-alumina.

9. A diode as in claim 8, wherein the ceramic has a honeycomb configuration including a plurality of pores therein.

10. A diode as in claim 9, wherein the pores comprise about 300 pores/inch$^2$ of the honeycomb, and wherein each pore has four sides with a wall thickness of about 0.1 mm.

11. A diode as in claim 1, wherein the porous dielectric layer is positioned at a distance from the cathode in the range of from about 0.02 to about 0.04 times the distance of the porous dielectric layer from the anode.

12. A diode as in claim 1, wherein the cathode is operable at an applied voltage of at least 500 Ky.

13. A method of generating a high current electron beam, comprising:
   providing a high power diode, said diode comprising:
      a cathode for emitting a primary electron discharge operable at an applied voltage of at least 50 KV;
      an anode; and
      a porous dielectric layer positioned between the cathode and the anode and spaced apart from the cathode to form a gap therebetween for receiving the primary electron discharge and generating a secondary electron emission in the dielectric layer; and
   applying a voltage of at least 50 KV to the diode to thereby generate the electron beam.

14. A method as in claim 13, wherein the porous dielectric layer comprises a honeycomb ceramic.

15. A method as in claim 14, wherein the honeycomb ceramic is cordierite and finiher includes a dielectric non-organic surface layer.

16. A method as in claim 15, wherein the surface layer comprises gamma-alumina.

17. A method as in claim 13, further comprising:
   providing an x-ray film; and
   exposing a desired sample to the electron beam so as to expose the x-ray film and obtain an x-ray photograph of the sample.

18. A method as in claim 13, further comprising applying the electron beam in a polymerization reaction.

19. A method as in claim 13, further comprising applying the electron beam to sterilize a food product.

20. A method as in claim 13, further comprising applying the electron beam in a sterilization process.

21. A method as in claim 13, further comprising applying the electron beam to pump a laser.

22. A high power diode, comprising:
   a cathode for emitting a primary electron discharge operable at an applied voltage of at least 50 KV;
   an anode; and
   a honeycomb ceramic including a plurality of pores therein, positioned between the cathode and the anode and spaced apart from the cathode to form a gap therebetween for receiving the primary electron discharge and generating a secondary electron emission in the dielectric layer.

23. A diode as in claim 22, wherein the cathode comprises a carbon fiber.

24. A diode as in claim 22, wherein the area of the cathode is in the range of from about 1 cm$^2$ and about 2 m$^2$, and wherein the porous dielectric layer is about the same area as the cathode and is positioned in alignment therewith.

25. A diode as in claim 22, wherein the ceramic is cordierite and has a dielectric non-organic surface layer.

26. A diode as in claim 24, wherein the surface layer comprises gamma-alumina.

27. A diode as in claim 22, wherein the pores comprise about 300 pores/inch$^2$ of the honeycomb, and wherein each pore has four sides with a wall thickness of about 0.1 mm.

28. A diode as in claim 22, wherein the honeycomb ceramic is positioned at a distance from the cathode in the range of from about 0.02 to about 0.04 times the distance of the honeycomb ceramic from the anode.

29. A diode as in claim 22, wherein the cathode is operable at an applied voltage of at least 500 KV.

\* \* \* \* \*